United States Patent [19]

Hirose

[11] Patent Number: 4,859,445
[45] Date of Patent: Aug. 22, 1989

[54] PROCESS FOR PREPARING CHLORORHODIUMIC ACID

[75] Inventor: Akio Hirose, Tokyo, Japan

[73] Assignee: Tanaka Kikinzoku Kogyo K.K., Japan

[21] Appl. No.: 241,940

[22] Filed: Sep. 8, 1988

[51] Int. Cl.$^4$ .................. C01B 7/00; C01B 11/00; C01B 9/00
[52] U.S. Cl. ............................ 423/462; 423/472; 423/491
[58] Field of Search ............... 423/462, 472, 491

[56] References Cited

PUBLICATIONS

Griffith, The Chemistry of the Rarer Platinum Metals, pp. 320–323 (1967).

*Primary Examiner*—Gregory A. Heller
*Attorney, Agent, or Firm*—Klauber & Jackson

[57] ABSTRACT

Enclosed herein is a process for preparing chlororhodiumic acid which comprises dissolving rhodium or a rhodium containing mixture in hydrochloric acid by bubbling chlorine gas therein under heating and suspending the rhodium to provide the chlororhodiumic acid in the hydrochloric acid solution.

According to the present invention, the dissolving reaction proceeds sufficiently at a high speed under the relatively moderate conditions and in a more simplified process than that of a prior art, to provide the chlororhodiumic acid in high yield. The chlorine gas can be removed from the hydrochloric acid solution easily, and if the chlorine gas is contaminated in the solution as a chlorine ion, the chlorine ion is already present in the hydrochloric acid solution so that the contaminated ion will never be recognized as impurities. Therefore, the high purity chlororhodiumic acid can be obtained.

4 Claims, No Drawings

PROCESS FOR PREPARING CHLORORHODIUMIC ACID

BACKGROUND OF THE INVENTION

The present invention relates to a process for preparing chlororhodiumic acid by dissolving rhodium in hydrochloric acid.

Heretofore, in order to prepare chlororhodiumic acid ($H_3RhCl_6$), the mixture of rhodium powders and sodium chloride or barium chloride is heated in a chlorine gas atmosphere so that the rhodium powders are converted into such a soluble salt as $Na_3RhCl_6$ which is extracted with water to provide a chlororhodiumic acid solution. Since, however, sodium or barium is contained in this solution, this method has the disadvantages that $Na^+$ or $Ba^{2+}$ should be removed by means of ion exchange or the like, and that the soluble salt is difficult to be formed so that the yield becomes low.

In addition to this method, various researches have been performed in which rhodium powders and chlorine are reacted to produce rhodium chloride. However, in all the researches, since a temperature higher than 250° C. is required for the said reaction, an apparatus having the thermostability and the like is required so that the economical operation cannot be assured when the reaction is employed as one of the processes for the production of the chlororhodiumic acid.

Further, although fine rhodium black which is slightly dissolved in concentrated hydrochloric acid provides chlororhodiumic acid after being boiled with the hydrochloric acid, the dissolved amount thereof is insufficient so that the economical operation cannot be performed.

Although a method for extracting platinum group metals such as rhodium supported on such an inorganic porous support as activated alumina or the like employing hydrochloric acid and an oxidizing agent is also proposed, the yield thereof cannot be raised because the metals to be extracted is supported, so that the washing process is further employed after the extraction by the hydrochloric acid and the oxidizing agent for improving the recovery rate. By employing this method, a satisfactory recovery rate can be attained, but it is desirable, for improving the operation efficiency, to reduce the number of the processes employed. Further, this method cannot be applied without modification to the production of the chlororhodiumic acid.

SUMMARY OF THE INVENTION

An object of this invention is to provide a process for preparing chlororhodiumic acid by dissolving rhodium in hydrochloric acid nearly quantitatively.

Another object of the invention is to prepare the chlororhodiumic acid by means of relatively simple operations.

A characteristic feature of the present invention is a process for preparing chlororhodiumic acid which comprises dissolving rhodium or a rhodium containing mixture in hydrochloric acid by bubbling chlorine gas therein under heating with suspending the rhodium.

In the invention, the chlorine gas functions as an oxidizing agent and the reaction takes place in the liquid phase sio that the reaction proceeds sufficiently at a high dissolving rate under the relatively moderate conditions such as a temperature below the boiling temperature of the hydrochloric acid and in a more simplified process than that of a prior art, to provide the chlororhodiumic acid in high yield. The chlorine gas which is the oxidizing agent can be removed from the hydrochloric acid solution relatively easily, and if the chlorine gas is contaminated in the solution as a chlorine ion, the chlorine ion is already present in the hydrochloric acid solution so that the contaminated ion will never be recognized as impurities. Therefore, in accordance with the present invention, the high purity chlororhodiumic acid can be produced.

DETAILED DESCRIPTION OF THE INVENTION

The rhodium employed in the present invention includes, for example, a rhodium element contained in a rhodium alloy which consists of rhodium and a small amount of another platinum group metal as well as a pure rhodium element such as rhodium powders and rhodium black. The rhodium containing mixture means a mixture containing rhodium which has been employed in the other uses, especially a recovery residue containing rhodium.

Although the rhodium alloy or the recovery residue can be employed without pretreatment, they are preferably pretreated to raise the purity of the resulting chlororhodiumic acid solution.

Although the concentration of the hydrochloric acid employed is not especially restricted, the hydrochloric acid of 6 to 12 normals may be preferably employed. When the hydrochloric acid of less than 6 normals is employed, too much time is required for dissolving the rhodium. When, on the other hand, the hydrochloric acid of more than 12 normals is employed, a reduction of the dissolving time is not so good as to be expected so that employing the highly concentrated hydrochloric acid is economically unfavorable.

In the instand invention, the rhodium or the rhodium containing mixture is stirred in the hydrochloric acid solution to make it suspended. The rhodium is satisfactorily dispersed in the hydrochloric acid solution through said suspension so that the contact between the hydrochloric acid and the chlorine gas is sufficiently performed to raise the reactivity.

The hydrochloric acid solution is then heated to further raise the reactivity as the suspended state of the rhodium is maintained by stirring. In order to obtain the dissolving rate more than a definite value, it is preferable that the heating temperature is at least 60° C. with the upper limit thereof being the boiling point of the hydrochloric acid (the boiling point of the hydrochloric acid of 20.24% is 110° C. under one atmospheric pressure). The heating temperature may be properly selected depending on the dissolving rate required.

Chlorine gas is then bubbled into the hydrochloric acid solution as the stirring and the heating are continued. The bubbling speed of the chlorine gas varies with the heating temperature and the volume of the solution, and the bubbling speed is preferably between 20 and 200 ml/minute-l-solution. The most favorable bubbling speed at 100° C. is about 50 ml of the chlorine gas/minute-l-solution.

Although the detailed reaction mechanism remains unclear, the chlorine gas functions as an oxidizing agent to contribute to oxidation of the rhodium. In this instance, since the reaction takes place in the liquid phase different from the prior art reaction employing the chlorine gas, the reaction sufficiently proceeds under rather moderate conditions such as under a reaction temperature below the boiling point of the hydrochloric acid.

Further, the chlorine gas can be removed from the solution, and even if the gas is contaminated as a chlorine ion, the contaminated ion will never be recognized as impurities because the chlorine ion is already present in the hydrochloric acid solution, so that, in accordance with the present invention, the high purity chlororhodiumic acid can be produced.

The invention will now be illustrated by the following Examples, which, however, are to be considered as merely exemplary of the practice of the invention, and not as delimitive thereof.

EXAMPLE 1

100 g of rhodium black was suspended in 1.1 l of a 11.3 normal hydrochloric acid solution with sufficient stirring. Chlorine gas was then bubbled into the solution with stirring at the rate of about 50 ml/minute, which was heated to 100° to 110° C. for 48 hours continuously. Thereafter the bubbling of the chlorine gas was ceased and the hydrochloric acid solution was filtered to separate the undissolved rhodium black. After drying, the weight of the undissolved rhodium black was measured to be 0.1 g (dissolving rate: 99.9%). The filtered solution was found to be a chlororhodiumic acid solution.

EXAMPLE 2

100 g of rhodium powders were treated in accordance with the procedures mentioned in Example 1 except that the bubbling time was 80 hours and the bubbling rate was about 40 ml/minute. The undissolved powders were 0.2 g (dissolving rate: 99.8%) and the chlororhodiumic acid solution was prepared.

What is claimed is:

1. A process for preparing chlororhodiumic acid which comprises dissolving rhodium or a rhodium-containing mixture in hydrochloric acid having a concentration in the range of 6 to 12 normal by bubbling chlorine gas therein while heating at a temperature in the range of 60° C. to the boiling point of the hydrochloric acid and suspending the rhodium, to produce the chlororhodiumic acid.

2. The process as claimed in claim 1, wherein the bubbling speed of the chlorine gas is 20 to 200 ml/minute-l-solution.

3. The process as claimed in claim 1, wherein the rhodium is rhodium black.

4. The process as claimed in claim 1, wherein the rhodium is rhodium powders.

* * * * *